United States Patent Office 3,108,960
Patented Oct. 29, 1963

3,108,960
LUBRICANT COMPOSITION
William M. Le Suer, Cleveland, Ohio, assignor to The Lubrizol Corporation, Wickliffe, Ohio, a corporation of Ohio
No Drawing. Filed May 2, 1961, Ser. No. 107,053
18 Claims. (Cl. 252—32.7)

This invention relates to organic phosphorus- and sulfur-containing compositions and to a process for preparing the same. In a more particular sense this invention relates to organic phosphorus- and sulfur-containing compositions which may be converted to products having a large amount of metal. The metal-containing products are useful especially as additives for hydrocarbon oil compositions.

The treatment of hydrocarbon materials with inorganic phosphorus and sulfur reagents for preparing organic phosphorus- and sulfur-containing compositions is well known in the art. Such treatment is exemplified by the reaction of an olefin polymer with a phosphorus sulfide such as phosphorus pentasulfide. A principal utility of the product of such treatment is in the preparation of oil-soluble metal salts by first hydrolyzing such product to an acidic intermediate and then neutralizing the acidic intermediate with a basic metal neutralizing agent. The metal salts are useful as detergent additives for hydrocarbon oil compositions such as gasolines, burner fuel oils, and lubricants for internal combustion engines, power transmission units, gear units, etc. When employed for this purpose, the metal salts depend for their effectiveness to a large measure upon their relative metal content; that is to say, additives of a higher metal content are more effective detergents than otherwise similar additives of a lower metal content. A great deal of effort has, therefore, been devoted to the development of commercially feasible processes by which detergent additives containing a large amount of metal can be derived from organic phosphorus-containing reactants. The amount of metal that can be incorporated into an acidic, organic, phosphorus-containing reactant is ordinarily dependent upon the amount of phosphorus present in such reactant. It will be readily appreciated, therefore, that methods for incorporating large amounts of phosphorus into hydrocarbon materials are highly desirable for the preparation of effective detergent additives for hydrocarbon oils.

The commercial usefulness of processes for incorporating phosphorus into hydrocarbon materials depends also upon the efficiency of the utilization of the inorganic phosphorus reagent. Thus, processes capable of effecting a high degree of utilization of the inorganic phosphorus reagent are obviously advantageous for reasons of economy.

Accordingly, it is an object of this invention to provide a method for preparing organic phosphorus-containing compositions.

It is also an object of this invention to provide organic phosphorus containing compositions which can be converted to products containing a large amount of metal.

It is also an object of this invention to provide a method for preparing organic phosphorus-containing compositions having a relatively high phosphorus content.

It is also an object of this invention to provide a method for the treatment of hydrocarbon materials with an inorganic phosphorus reagent whereby such method characterized by a higher degree of utilization of inorganic phosphorus reagent than has heretofore been attainable by prior art methods.

It is a further object of this invention to provide detergent additives for hydrocarbon oils.

It is another object of this invention to provide hydrocarbon oil compositions having improved detergent properties.

These and other objects are attained in accordance with this invention by providing a process for preparing phosphorus- and sulfur-containing compositions which comprises reacting at a temperature above about 130° C. a mixture of a chlorinated olefin polymer with a phosphorus sulfide in an amount of about 0.5 mole to about 2 moles of phosphorus for each mole of chlorine present in said chlorinated olefin polymer. Sulfur, in an amount up to about one mole for each mole of phosphorus as the phosphorus sulfide, may also be used as a reactant in the process. The product of the above process, as indicated previously, contains phosphorus, sulfur and a small amount of chlorine. A large portion of the sulfur is reactive and is readily removed by hydrolysis. The phosphorus, however, is more stably bound to the polymer molecules and remains in the polymer even after treatment of the product with steam. The product of hydrolysis is an acidic composition which is susceptible to neutralization by treatment with a basic inorganic metal neutralizing agent such as a metal oxide, metal hydroxide, metal carbonate, metal sulfide, metal bicarbonate, metal hydride, or the like.

A critical feature of the process of this invention is the use of a chlorinated polymer in the reaction of a phosphorus sulfide. The presence of chlorine in the polymer molecule reactant is responsible not only for a high degree of utilization of the phosphorus sulfide reagent and a consequent high phosphorus content in the product, but also for the unexpectedly effective detergent properties which characterize the metal salts derived from such product. It appears that the presence of chlorine in a polymer molecule serves to activate that molecule with respect to its susceptibility to reaction with the phosphorus sulfide reagent. The nature of this "activation" is not known.

The relative amounts of the reactants used in the process of this invention are related to the reactivity of the chlorine in the polymer with the phosphorus sulfide. The amount of the phosphorus sulfide should not exceed that which corresponds to about two moles of phosphorus for each mole of the chlorine in the chlorinated polymer. Thus one mole of a monochlorinated polyisobutylene may be reacted with up to one mole of phosphorus pentasulfide. It is preferred, for reasons of economy, to use an amount of the phosphorus sulfide corresponding to about one mole of phosphorus for each mole of the chlorine in the chlorinated polymer.

As indicated previously, a principal objective of the process is the incorporation of phosphorus into the product, and the chlorine in the polymer serves to aid in this incorporation of phosphorus. The apparent maximum effectiveness of the chlorine in serving this purpose is reflected by the upper limit of the ratio of two moles of phosphorus to one mole of chlorine. The use of a larger amount of the phosphorus sulfide results in a product having little or no more phosphorus than that obtained by the use of a phosphorus sulfide in the amount indicated by the above ratio. Similarly, the use of less than about 0.5 mole of phosphorus as the phosphorus sulfide is not contemplated inasmuch as such use results in a product having too little phosphorus to be useful for the purpose of this invention, i.e., for conversion to metal salts having a sufficient amount of metal to be useful as detergent additives for hydrocarbon oils. In a preferred embodiment of this invention, chlorinated polymers having from about 2% to about 5% by weight of chlorine are reacted with a phosphorus sulfide in an amount equal from about 1 mole to about 2 moles of phosphorus for each mole of the chlorine present in the chlorinated polymer.

As indicated previously, this invention contemplates also the reaction of a chlorinated polymer with a phosphorus sulfide and sulfur. Such reaction results in a product having a larger amount of sulfur than the product obtained by the reaction of the chlorinated polymer with the phosphorus sulfide alone. This excess sulfur in the product has been found to enhance the oxidation-inhibiting properties of the metal salt derived from such product, and for this reason the use of sulfur in the process of this invention is in many instances preferred.

When sulfur is used, it is used in an amount up to about one mole for each mole of phosphorus as the phosphorus sulfide. If a larger amount of sulfur is used, the product is considerably darker in color and its utility is impaired. The amount to be used, within the indicated limits is determined primarily by the amount of sulfur desired in the product.

The phosphorus sulfides contemplated for use in the process of this invention include, e.g., phosphorus heptasulfide, phosphorus sesquisulfide, phosphorus pentasulfide, mixtures of phosphorus and sulfur, and mixtures of phosphorus sulfides. Of these, phosphorus pentasulfide has been found to be especially effective in incorporating phosphorus and sulfur into the polymer reactants of this invention.

The olefin polymers from which the chlorinated polymers of the above-mentioned process are derived include principally the substantially aliphatic polymers of lower mono-olefins such as ethylene, propene, isobutene, or 1-butene. The polymers include also interpolymers of these lower mono-olefins with a minor amount of aromatic olefins, diolefins or cyclic olefins provided that at least about 95% by weight of the interpolymers is composed of the lower mono-olefin units so that the substantially aliphatic character of the polymer is not altered. Examples of the polymers include polyisobutenes, polypropenes, polyethylenes, copolymer of 96% of isobutene and 4% of styrene, copolymer of 98% of isobutene and 2% chloroprene, copolymer of 99% of isobutene, 1% of butadiene, and 1% of n-hexene, etc. Polymers of isobutene are most frequently used because of their ready availability. The molecular weights of the polymers may vary within wide ranges such as for example, from 200–1,000,000 or even higher. Polymers of intermediate molelecular weights, i.e., 500–10,000 are especially useful. In certain instances polymers having molecular weights above about 40,000 are preferred for reasons of their viscosity index improving properties.

The method by which the substantially aliphatic olefin polymers may be chlorinated is not critical. A convenient method comprises passing a stream of chlorine into the olefin polymer at a temperature of 50–120° C. until the desired amount of chlorine has been incorporated into the polymer molecules. An inert solvent such as carbon tetrachloride, ethylene dichloride, mineral oil or n-hexane may be used in the chlorination reaction.

The reaction conditions of the process involve merely mixing the reactants and heating the mixture usually with agitation at a temperature above about 130° C. A solvent such as mineral oil may be employed to facilitate mixing and control of temperature. At the early stage of the reaction a suspension of the solid phosphorus sulfide reagent in the reaction medium is usually visible. As the reaction progresses to completion, a homogeneous mass is obtained. The product may be filtered to remove any unreacted phosphorus sulfide, although in many instances filtration is not necessary. The preferred temperature for the reaction is in excess of about 150° C. and below the decomposition point of the components of the reaction mixture. In most instances the reaction is preferably carried out at about 180°–250° C.

The product of the herein described process may be hydrolyzed to an acidic composition simply by treatment with water or steam at a temperature above about 80° C. If the hydrolysis is attempted at a temperature below about 80° C. the product is viscous and processing becomes difficult. The preferred temperature for effecting hydrolysis is 100°–150° C. Hydrolysis removes a considerable portion of the sulfur from the product, but almost all of the phosphorus remains. The acidic composition may be converted to a metal salt by treatment with a basic metal neutralizing agent, such as the metal hydroxide, metal oxide, metal carbonate, metal sulfide, metal bicarbonate, etc. When a stoichiometrically excess amount of the metal neutralizing agent is used, the excess metal may be solubilized in the final product and provides excess basicity which is often desirable in many applications such as in hydrocarbon oil compositions. While a great number of basic metal neutralizing agents may be used to convert the acidic composition to the corresponding neutral or basic metal salts, the alkaline earth and alkali metal neutralizing agents are most commonly used for reasons of the particular effectiveness of their metal salts as detergent additives in hydrocarbon oil compositions. The especially preferred metal neutralizing agents are those of barium and calcium, e.g., barium hydroxide, calcium hydroxide, barium oxide, etc.

A particularly useful method for preparing the basic salts, i.e., metal salts in which the metal is present in an amount stoichiometrically greater than that of the organic acid radical, involves carbonating a mixture of the acidic composition and a stoichiometric excess of an alkaline earth metal neutralizing agent, e.g., barium oxide or calcium hydroxide in the presence of a small amount of water and a promoter compound such as a phenolic compound, e.g., phenol, naphthol, heptylphenol, the condensation product of a phenol with formaldehyde, or an alcohol, e.g., methyl alcohol, ethyl alcohol, n-pentyl alcohol, ethylene glycol, and Cellosolve. The carbonation step is usually carried out at a temperature ranging from about 50° C. to about 200° C.

The following examples illustrate in greater detail the process of this invention.

EXAMPLE 1

A mixture of 788 grams of a chlorinated polyisobutene having a molecular weight of 760 and a chlorine content of 4.7% (by weight), and 127 grams of phosphorus pentasulfide is heated at 200–210° C. for 4 hours with agitation, cooled, and hydrolyzed by blowing with steam at 160° C. for 4 hours. The hydrolyzed product is dried at 160° C. for 1 hour, mixed with 831 grams of mineral oil, filtered. The filtrate has the following analysis:

Percent P _____ 1.91
Percent S _____ 1.25
Percent Cl _____ 0.09
Acid number _____ 58

The effect of the presence of chlorine in the polymeric reactant is shown by the results of an identical experiment in which polyisobutylene (containing no chlorine) is substituted for chlorinated polyisobutylene in the above procedure. The resulting product contains but 1.77% P and 0.90% S, and has an acid number of but 52.

EXAMPLE 2

A mixture of 1180 grams of a chlorinated polyisobutene having a molecular weight of 800 and a chlorine content of 4.7%, and 333 grams of phosphorus pentasulfide is heated at 210° C. for 4 hours, diluted with 1409 grams of mineral oil, and filtered at 160° C. The filtrate is found to have the following analysis:

Percent P _____ 3.27
Percent S _____ 7.25
Percent Cl _____ 0.37

EXAMPLE 3

To 1976 grams of a mineral oil solution containing 43% by weight of a chlorinated polyisobutene having a molecular weight of 60,000 and a chlorine content of 7.14% based on the weight of the oil solution, there is added 127 grams of phosphorus pentasulfide at 105°–202° C. throughout a period of 2.3 hours. The mixture is heated at 200°–225° C. for 5 hours, hydrolyzed with steam at 150°–170° C., dried at 155°–180° C./220 mm., diluted with 1000 grams of mineral oil and filtered. The filtrate is found to have the following analysis:

Percent P _____ 0.91
Percent S _____ 1.16
Percent Cl _____ 0.37
Acid number _____ 31

EXAMPLE 4

A neutral barium salt of the hydrolyzed product of Example 3 is prepared by mixing 1000 grams of the hydrolyzed product with 41 grams of barium oxide, 10 grams of water and 318 grams of mineral oil at 70° C., heating the mixture at 150° C. for 1 hour, and dried by heating at 150° C. for 1.5 hours. The product is then filtered and the filtrate is found to have the following analysis:

Percent P _____ 0.66
Percent S _____ 0.83
Percent Ba _____ 2.14
Percent Cl _____ 1.8

EXAMPLE 5

A basic barium salt of the hydrolyzed product of Example 3 is prepared by mixing 1000 grams of the hydrolyzed product with 84 grams of barium oxide, 25 grams of water, 25 grams of heptylphenol (promoter) and 709 grams of mineral oil at 70° C., heating the mixture to 150° C. in 1.5 hours, passing carbon dioxide into the mixture at a rate of 5 cu.-ft. per hour until the mixture is slightly acidic and filtering the resulting mixture. The filtrate is found to have the following analysis:

Percent P _____ 0.49
Percent S _____ 0.63
Percent Cl _____ 1.37
Percent Ba _____ 3.58

EXAMPLE 6

A mixture of 700 grams of a chlorinated copolymer of 80% by weight of isobutene and 20% by weight of piperylene having a molecular weight of 2200 and a chlorine content of 1.7% and 39 grams of phosphorus pentasulfide is heated at 210° C. for 2 hours, cooled at 160° C., diluted with 484 grams of mineral oil, hydrolyzed by treatment with steam at 160° C. for 1 hour, dried at 160° C. for 2 hours and filtered. The filtrate is found to have the following analysis:

Percent P _____ 0.93
Percent S _____ 1.52
Percent Cl _____ 0.44

The above procedure is repeated except that the unchlorinated copolymer is used in place of the chlorinated copolymer. The product is found to have the following analysis:

Percent P _____ 0.68
Percent S _____ 0.84

EXAMPLE 7

A mixture of 785 grams of a chlorinated polyisobutene having a molecular weight of 790 and a chlorine content of 4.7%, and 44 grams of phosphorus sesquisulfide is heated at 200–210° C. for 4 hours, hydrolyzed by treatment with steam at 160° C. for 4 hours, dried at 160° C. for 1 hour, diluted with 790 grams of oil, and filtered. The filtrate is found to have the following analysis:

Percent P _____ 0.94
Percent S _____ 0.58
Percent Cl _____ 0.19
Acid number _____ 22

The above procedure is repeated except that unchlorinated polyisobutene is used in place of the chlorinated polyisobutene. The product is found to have the following analysis:

Percent P _____ 0.6
Percent S _____ 0.597
Acid number _____ 9

EXAMPLE 8

A mixture of 1038 grams of the product of Example 1, 654 grams of mineral oil, and 169 grams of heptylphenol is heated to 65° C. To this mixture three are added 54 grams of water at 70° C. and then 463 grams of barium oxide at 70°–120° C. The mixture is heated to 150° C. and blown with carbon dioxide at this temperature until it is substantially neutral. The hot mixture is filtered. The filtrate is found to have the following analysis:

Percent P _____ 0.89
Percent S _____ 0.52
Percent BaSO$_4$ ash _____ 25.6

EXAMPLE 9

To 788 grams of a chlorinated polyisobutene having a molecular weight of 790 and a chlorine content of 4.7% there is added at 80° C., 35 grams of sulfur, and the mixture then heated to 180° C. in 2 hours. To this mixture there is added 122 grams of phosphorus pentasulfide and the resulting mixture is heated at 180° C. for 2.5 hours, then hydrolyzed by treatment with steam at 160° C. for 4 hours, dried at 160° C. for 1 hour, and filtered. The filtrate is found to have the following analysis:

Percent P _____ 1.77
Percent S _____ 1.77
Percent Cl _____ 0.04

EXAMPLE 10

A basic barium salt of the product of Example 9 is prepared by mixing 1078 grams of this product with 199 grams of heptylphenol, 990 grams of mineral oil, and 67 grams of water, adding 565 grams of barium oxide to this mixture at 70°–120° C., heating the resulting mixture to 150° C. until it is substantially neutral, drying the mixture at 150° C. for 0.5 hour and filtering. The filtrate is found to have the following analysis:

Percent P _____ 0.71
Percent S _____ 0.65
Percent BaSO$_4$ ash _____ 26.5

A comparison of the product of the above process with a product obtained by the following procedure (in which an unchlorinated polyisobutene is the polymeric reactant) shows the effectiveness of the presence of chlorine in the polymer in assisting the utilization of the phosphorus pentasulfide.

A mixture of 800 parts (by weight) of polyisobutene (having a molecular weight of 760) and 72 parts of phosphorus pentasulfide is heated at 260° C. for 8.2 hours, cooled to 150° C., and hydrolyzed with steam at 150–155° C. To a mixture of 398 parts of mineral oil, 5 parts of water and 15 parts of barium oxide, there is added (within a period of 1.7 hours) 138 parts of the above hydrolyzed product (at 93° C.), 4 parts of water, and 47 parts of heptylphenol, and the resulting mixture is heated at 90° C. for an hour. An additional 65 parts of barium oxide is added and the mixture is heated to 135° C., then blown with carbon dioxide for 8 hours at 135°–140° C. A second additional 65 parts of barium oxide is added and the mixture is again blown with carbon dioxide at 135°–140° C. for four hours, and filtered. The filtrate has the following analysis:

Percent P _____ 0.43
Percent S _____ 0.6
Percent $BaSO_4$ ash _____ 27.3

The products obtained from the process illustrated above are in most cases liquids although the use in the process of a high molecular weight (e.g., above 50,000) chlorinated polymer reactant will result in an amorphous rubbery material. The principal utility of the organic phosphorus- and sulfur-containing compositions is in the preparation of their corresponding metal salts. The metal salts, especially the alkaline earth metal salts, are useful especially as detergent additives for hydrocarbon oils. When added to a hydrocarbon oil, these metal salts are capable of maintaining the oil degradation products in suspension in the oil phase and thus preventing the formation of sludge and varnish deposits. In this respect, it will be noted again that a critical feature of this invention is the reaction of a chlorinated polymer with a phosphorus sulfide or a mixture of phosphorus sulfide and sulfur to produce products which may then be converted to metal salts. The presence of chlorine in the polymer molecule is responsible for enhanced detergent properties of the metal salts of this invention.

The amount of the metal salt of this invention to be used as a detergent additive in a hydrocarbon oil depends largely upon the type of the hydrocarbon oil, the detergent properties desired in the final composition and the type of service to which the final composition is to be subjected. Ordinarily, the amount of the additive is within the approximate range from 0.001% to 10% by weight of the hydrocarbon oil composition. For example, fuel oils or gasolines may be stabilized against the deposition of sludge by the incorporation therein from about 0.001% to about 0.1% of the additive. Lubricating oils for gasoline engines and power-transmission units often contain from about 0.2% to about 10% of the additive, and lubricating oils for diesel engines may contain as much as 10% or even more of the additive.

The effectiveness of the metal salts of this invention as detergent additives in hydrocarbon is indicated by the results of a detergency test in which a 350 cc. lubricant sample consisting of a Mid-Continent, conventionally refined lubricating oil having a viscosity of 200 SUS/100° F. and containing 0.001% by weight of iron naphthenate as a promoter of oil degradation and 1.5% by weight of the detergent additive to be tested is placed in a 2″ x 15″ borosilicate tube. A 1⅜″ x 5⅞″ SAE 1020 steel panel is immersed in the oil. The sample then is heated at 300° F. for 96 hours while air is bubbled through the oil at a rate of 10 liters per hour. The oxidized sample is cooled at 120° F., mixed with 0.5% by weight of water, homogenized, allowed to stand at room temperature for 24 hours and then filtered through two layers of No. 1 Whatman filter paper at 20 mm. Hg pressure. The precipitate is washed with naphtha and dried. The weight of the precipitate, adjusted to milligrams per 100 cc. of oil tested, is taken as a measure of the effectiveness of the detergent additive, i.e., the greater the weight of the precipitate the less effective the additive.

When subjected to this test, two lubricants containing additives of this invention, one containing the metal salt of Example 8 and the other containing the metal salt of Example 10, yield respectively, 1.3 and 15.2 milligrams of precipitate. For purpose of comparison, two lubricants containing additives made by prior art processes, i.e., according to the procedures of Example 8 and Example 10 respectively except that the chlorinated polymer reactant is replaced by the same polymer which has not been chlorinated, give respectively 300 and 1500 milligrams of precipitate.

*Table of Results*

| | Percent additive in fuel oil (by weight) | Oxygen bomb test sludge formed (mg./100 cc. of sample) | High temperature storage test, sludge formed (mg./600 g. of sample) |
|---|---|---|---|
| Fuel oil containing the product of Example 8. | 0.02<br>0.01<br>0.005 | None<br>0.5<br>5 | <br><br>3.7 |
| Fuel oil containing the product of the process of Example 10 except that an unchlorinated polyisobutene was used instead of the chlorinated polyisobutene. | 0.02<br>0.01<br>0.01 | 5<br>9.9<br>11 | <br><br>13.3 |
| Fuel oil | None | 7–8 | 47–52 |

The effectiveness of the metal salts of this invention in reducing the tendency of fuel oils to form sludge is shown by the results, summarized in the above table, of the Oxygen Bomb Test and the High Temperature Storage Test. In the Oxygen Bomb Test a 60 cc. sample of a catalytically cracked No. 2 light fuel oil containing a specified amount of the detergent additive to be tested, is placed in a glass container in an ASTM oxygen bomb (described in ASTM D525–49, for oxidation stability tests of gasoline). The internal pressure of the bomb is adjusted with gaseous oxygen to 100 pounds per square inch and the bomb is then placed in a constant temperature bath at 100° C. for 48 hours. At the end of the test the weight of the sludge formed is determined and is taken as the measure of the effectiveness of the detergent.

In the High Temperature Storage Test a sample of a catalytically cracked No. 2 light fuel oil containing a specified amount of the detergent additive in a glass container is placed in an oven at 150° F. for 14 days. At the end of the test the weight of the sludge formed is determined and is taken as a measure of the effectiveness of the detergent additive.

The efficacy of the metal salts of this invention as detergent additives in lubricant compositions for diesel engines is shown by results of a test described in U.S. Army Ordnance tentative test specification AXS-1551 (also known as the Caterpillar CRC–L–1 engine test) modified in that the fuel used in the engine has a sulfur content of 1% (significantly higher than that of the specified fuel). By this test (duration of the test: 120 hours) a mineral lubricant containing 0.53% by weight of the metal salt of Example 8 gives the following results: (percent ring filling, 7; piston cleanliness rating, 99.5 (100 being perfect).

The present invention contemplates the use, in lubricant compositions containing the metal salts of this invention, of other commonly used additives such as extreme pressure addition agents, corrosion inhibiting agents, antifoam agents, viscosity index improving agents, pour point depressing agents, rust inhibiting agents, ashless detergents and also supplemental ash containing detergents. Such additives may be exemplified by chlorinated wax containing 50% by weight of chlorine; organic sulfides such as dibutyl tetrasulfide, dibenyl disulfide, and dicyclohexyl trisulfide, sulfurized sperm oil, sulfurized methyl ester of oleic acid, sulfurized dipentene; reaction product of $P_2S_5$ with turpentine; dialkyl phosphorodithioates such as zinc dihexylphosphorodithioate, high molecular weight polybutenes; high molecular weight poly-(alkyl methacrylates); ashless detergents such as the reaction product of alkenyl succinic acid with ammonia or an amine, copolymer of an alkyl methacrylate with a minor amount of an alkylamino-substituted alkyl methacrylate, etc. The combination of the metal salts of this invention with zinc salts of organic phosphorodithioic acids are particularly effective for use in lubricant compositions for internal combustion engines.

What is claimed is:

1. A process for preparing organic phosphorus- and sulfur-containing compositions which comprises reacting at a temperature above about 130° C. a mixture of a chlorinated substantially aliphatic polymer of a lower mono-olefin containing from about 0.1% to about 20% by weight of chlorine and a phosphorus sulfide in an amount ranging from about 0.5 mole to about 2 moles of phosphorus for each mole of the chlorine present in said polymer.

2. The process of claim 1 characterized further in that the reaction mixture contains sulfur in an amount not exceeding about 1 mole per mole of the phosphorus as the phosphorus sulfide.

3. The process of claim 1 characterized further in that the chlorinated olefin polymer contains from about 2 to about 5% by weight of chlorine.

4. The process of claim 1 characterized further in that the chlorinated polymer has a molecular weight within the range from about 250 to about 10,000.

5. The process of claim 1 characterized further in that the chlorinated polymer is derived from an olefin having 2 to 4 carbon atoms.

6. A process for preparing organic phosphorus- and sulfur-containing compositions which comprises reacting at a temperature from about 160° C. to about 250° C., a mixture of a chlorinated substantially aliphatic polymer of a lower mono-olefin containing from about 2% to about 5% by weight of chlorine and a phosphorus sulfide in an amount equal to about 1 mole of phosphorus for each mole of the chlorine present in said polymer.

7. The process of claim 6 characterized further in that the phosphorus sulfide is phosphorus pentasulfide.

8. The process of claim 6 characterized further in that the chlorinated polymer is derived from isobutene.

9. The process for preparing organic phosphorus- and sulfur-containing compositions which comprises reacting at a temperature from about 160° C. to about 250° C. a mixture of a chlorinated polyisobutene having a molecular weight of at least about 500 and containing from about 2% to about 5% by weight of chlorine with phosphorus pentasulfide in an amount equal to about 1 mole of phosphorus for each mole of the chlorine present in said chlorinated polyisobutene.

10. A process for preparing organic acidic phosphorus- and sulfur-containing compositions which comprises reacting at a temperature above about 130° C. a mixture of a chlorinated substantially aliphatic polymer of a lower mono-olefin containing from about 0.1% to about 20% by weight of chlorine and a phosphorus sulfide in an amount ranging from about 0.5 mole to about 2 moles of phosphorus for each mole of the chlorine present in said polymer and hydrolyzing the resulting product.

11. A process for preparing metal-, phosphorus- and sulfur-containing compositions which comprises reacting at a temperature above about 130° C. a mixture of a chlorinated substantially aliphatic polymer of a lower mono-olefin containing from about 0.1% to about 20% by weight of chlorine and a phosphorus sulfide in an amount ranging from about 0.5 mole to about 2 moles of phosphorus for each mole of the chlorine present in said polymer, hydrolyzing the resulting product and neutralizing the hydrolyzed product with a basic inorganic metal neutralizing agent.

12. A process for preparing metal-, phosphorus- and sulfur-containing compositions which comprises reacting at a temperature above about 130° C. a mixture of a chlorinated substantially aliphatic polymer of a lower mono-olefin containing from about 0.1% to about 20% by weight of chlorine and a phosphorus sulfide in an amount ranging from about 0.5 mole to about 2 moles of phosphorus for each mole of the chlorine present in said chlorinated polymer, hydrolyzing the resulting product, neutralizing the hydrolyzed product with at least a stoichiometric amount of a basic inorganic metal neutralizing agent in the presence of a promoter selected from the group consisting of phenols, naphthols, and substantially saturated alcohols, and treating the neutralized product with carbon dioxide.

13. The process of claim 12 characterized further in that the basic inorganic metal neutralizing agent is an alkaline earth metal neutralizing agent.

14. The product of claim 1.

15. The product of claim 11.

16. A lubricant composition comprising a major proportion of a lubricating oil and a minor proportion of a detergent additive prepared by the process comprising reacting at a temperature above about 130° C. a mixture of a chlorinated substantially aliphatic polymer of a lower mono-olefin containing from about 0.1% to about 20% by weight of chlorine and a phosphorus sulfide in an amount ranging from about 0.5 mole to about 2 moles of phosphorus for each mole of the chlorine present in said polymer, hydrolyzing the resulting product and neutralizing the hydrolyzed product with a basic inorganic metal neutralizing agent.

17. A fuel oil composition comprising a major proportion of a fuel oil in a minor proportion of a detergent additive prepared by the process of comprising reacting at a temperature above about 130° C. a mixture of a chlorinated substantially aliphatic polymer of a lower mono-olefin containing from about 0.1% to about 20% by weight of chlorine and a phosphorus sulfide in an amount ranging from about 0.5 mole to about 2 moles of phosphorus for each mole of the chlorine present in said polymer, hydrolyzing the resulting product and neutralizing the hydrolyzed product with a basic inorganic metal neutralizing agent.

18. A hydrocarbon oil composition comprising a major proportion of a hydrocarbon oil and a minor proportion of a detergent additive prepared by the process comprising reacting at a temperature above about 130° C. a mixture of a chlorinated substantially aliphatic polymer of a lower mono-olefin containing from about 0.1% to about 20% by weight of chlorine and a phosphorus sulfide in an amount ranging from about 0.5 mole to about 2 moles of phosphorus for each mole of the chlorine present in said polymer, hydrolyzing the resulting product and neutralizing the hydrolyzed product with a basic inorganic metal neutralizing agent.

References Cited in the file of this patent

UNITED STATES PATENTS

| | | |
|---|---|---|
| 2,313,248 | Lincoln et al. | Mar. 9, 1943 |
| 2,409,799 | Roberts | Oct. 22, 1946 |
| 2,444,947 | Musselman et al. | July 13, 1948 |
| 2,993,856 | Heisig et al. | July 25, 1961 |
| 3,003,959 | Wilson et al. | Oct. 10, 1961 |

FOREIGN PATENTS

| | | |
|---|---|---|
| 566,760 | Canada | Dec. 2, 1958 |